Figure 1:
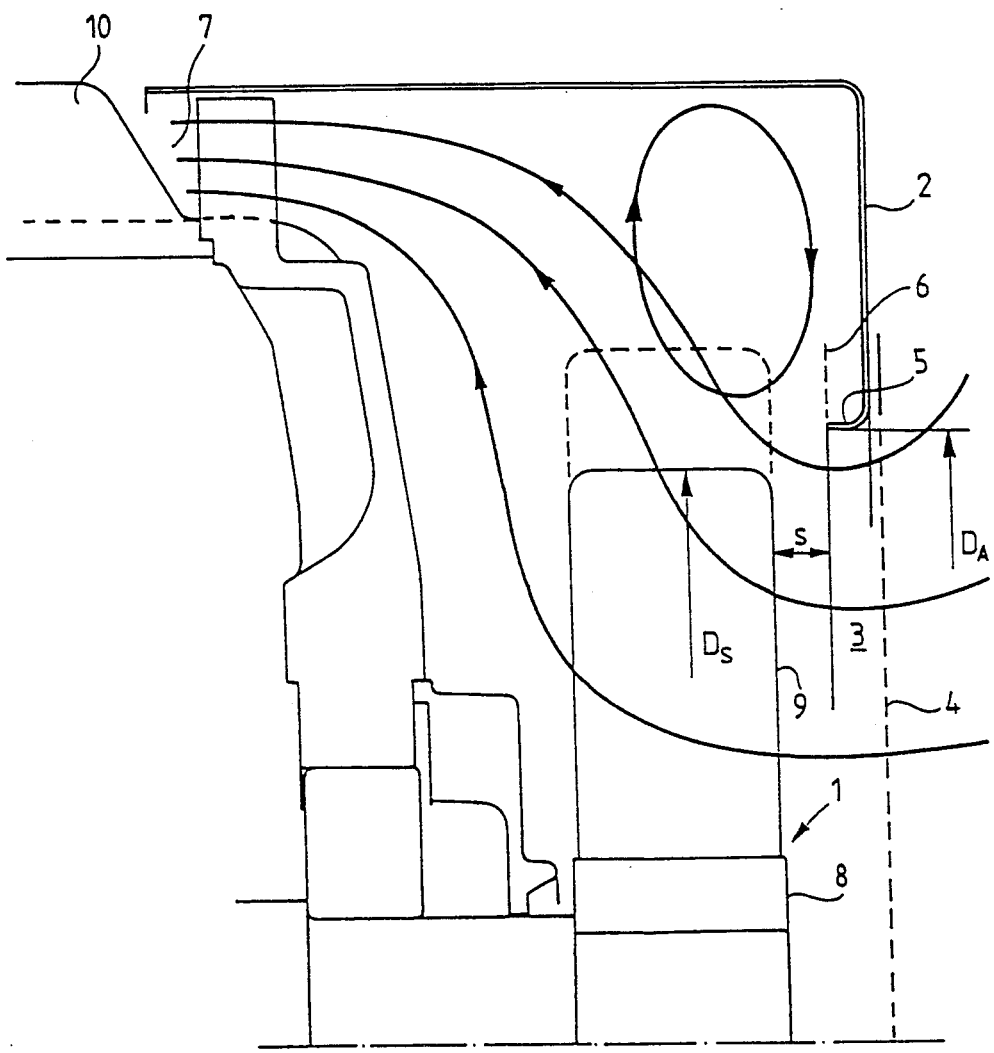

United States Patent [19]

Suomela

[11] Patent Number: 5,149,997
[45] Date of Patent: Sep. 22, 1992

[54] FAN FOR AN ELECTRICALLY OPERATED MACHINE

[75] Inventor: Martti Suomela, Vantaa, Finland

[73] Assignee: ABB Stromberg Drives Oy, Helsinki, Finland

[21] Appl. No.: 778,113

[22] PCT Filed: Jul. 12, 1990

[86] PCT No.: PCT/FI90/00182
§ 371 Date: Jan. 3, 1992
§ 102(e) Date: Jan. 3, 1992

[87] PCT Pub. No.: WO91/01586
PCT Pub. Date: Feb. 7, 1991

[30] Foreign Application Priority Data

Jul. 14, 1989 [FI] Finland .................... 893435

[51] Int. Cl.⁵ .................... H02K 9/06; H02K 9/00
[52] U.S. Cl. .................... 310/63; 310/58
[58] Field of Search .................... 310/52, 58, 60 R, 62, 310/63

[56] References Cited

U.S. PATENT DOCUMENTS 2,479,233  8/1949  Haas .................... 310/63

FOREIGN PATENT DOCUMENTS 3207448  9/1983  Fed. Rep. of Germany ........ 310/63
0150759 11/1980  Japan .................... 310/62
0160952 12/1980  Japan .................... 310/63
0144739  6/1988  Japan .................... 310/62

Primary Examiner—Steven L. Stephan
Assistant Examiner—C. LaBalle
Attorney, Agent, or Firm—Watson, Cole, Grindle & Watson

[57] ABSTRACT

The invention relates to a fan for an electrically operated machine, comprising a propeller (1) arranged axially about the machine and including a hub (8) and several blades attached to it and projecting substantially radially from it; and a cover (2) surrounding the propeller (1) in the front and on the sides and comprising a suction opening (3) on the suction side of the propeller (1) and an opening (7) on the pressure side for passing ventilation air into the machine parts to be cooled. To achieve a fan of simple construction, good efficiency and low noise level the blades (9) have a radius of curvature (R) and they are attached to the hub (8) at a blade angle ($\alpha$) between 25° and 70°; a gap (S) defined between the suction opening (3) or its cylindrical extension (5) and the blades (9) of the propeller (1) in the axial direction is no more than 20% of the outer diameter of the propeller (1); the inner diameter ($D_A$) of the suction opening (3) before the propeller (1) is 0.8 to 1.6 times the outer diameter ($D_S$) of the propeller; and the inner diameter of the cover (2) is at least 1.2 times the outer diameter ($D_S$) of the propeller or the inner diameter ($D_A$) of the suction opening, depending on which one of them is larger.

3 Claims, 2 Drawing Sheets

FAN FOR AN ELECTRICALLY OPERATED MACHINE

This invention relates to a fan for an electrically operated machine, comprising a propeller arranged axially about the machine and including a hub and several blades attached to it and projecting substantially radially from it; and a cover surrounding the propeller in the front and on the sides and comprising a suction opening on the suction side of the propeller, and an opening on the pressure side for passing ventilation air into the machine parts to be cooled.

Fans of this type are known e.g. from U.S. Pat. No. 2,479,233 and German Offenlegungsschrift 32 07 448, of which the former relates to an axial fan and the latter to a radial fan.

To operate properly, a typical axial fan has to be provided with a hood around the propeller and a guide vane assembly on one or both sides of the propeller for the control of the air flow. The size of the propeller and the blade angles of the blades have to be dimensioned to relatively accurately correspond to the dimensions of the intended place of application. Due to leakage losses, the gaps between the blades and the hood and between the blades and the hub have to be minimized. By means of the guide vanes, part of the tangential flow component created by the propeller, i.e. its dynamic pressure, can be converted into static or so-called effective pressure. If no guide vanes are provided, this relatively great flow component turns into losses, which involves a corresponding reduction in the static pressure created by the fan and the efficiency of the fan.

In most cases it is not possible to construct an axial fan in connection with an electrically operated machine in the best possible way. Space in the axial direction is usually limited so that no guide vanes can be used and the hood too has to be short. The other dimensions cannot be optimized either. In addition, the flow has to turn or disperse abruptly on the pressure side of the propeller in most applications, which in this type of fan involves considerable losses.

The radial fan of German Offenlegungsschrift 32 07 448 can be more easily fitted in an electrically operated machine without having to substantially compromise over its theoretical structural principles. This kind of radial fan, however, creates considerable turbulent currents in the forward and backward portions of the cover, which reduces efficiency.

The object of the present invention is to provide a fan for an electrically operated machine, by means of which the above-mentioned problems can be overcome and achieve a structurally simple fan of high efficiency and low noise level. The fan of the invention is characterized by the combination of the following features: the blades have a radius of curvature and they are attached to the hub at a blade angle between 25° and 70°; a gap defined between the suction opening or its cylindrical extension and the blades of the propeller in the axial direction is no more than 20% of the outer diameter of the propeller; the inner diameter of the suction opening before the propeller is 0.8 to 1.6 times the outer diameter of the propeller; and the inner diameter of the cover is at least 1.2 times the outer diameter of the propeller or the inner diameter of the suction opening, depending on which one of them is larger.

The fan of the invention, which is mainly an intermediate between an axial and radial fan, operates in one direction only. Therein the blade angle $\alpha$, width 1 and radius of curvature R of the blades of the fan propeller are selected so that the blades give the flow a relatively strong radial speed component. By displacing the blades onwards in the direction of rotation, this property can be made more effective and the noise level and losses can be reduced. The obtained radial flow, which both rotates in the direction of the propeller and is turbulent, acts similarly as an ejector, taking with it air from the relatively large gap defined between the propeller and the air guide. This flow increases the total air flow of the fan while decreasing the flow through the propeller, so that the propeller can be smaller. This, in turn, decreases the noise level of the fan. Even though the propeller to be used is structurally very similar to that used in conventional axial fans, its dimensions and operation are completely different. With a conventional cylindrical hood, this kind of propeller operates poorly if not at all, because such dimensions would cause the propeller to stall and result in a violent axially and radially turbulent flow. So it is not possible to use a conventional hood in the fan of the invention. It is an advantage for the operation if the cover portions are at a relatively great distance from the propeller in the radial direction, in order that said radial and turbulent flow would be able to form more freely, which increases the suction effect. The cover portions do not either create a hood effect typical of a conventional axial fan. In principle, a spiral-shaped hood would be very useful on the pressure side similarly as in radial fans.

If the suction opening comprises a cylindrical extension and the outer diameter of the propeller is greater than the diameter of the suction opening in front of the propeller, the ejector effect is also directed to the space outside the extension, that is, the turbulent flow within the area of the tip of the blade tends to be short-circuited, which is a drawback in view of the operation, efficiency and noise level of the fan. If the suction opening cannot be made larger, this flow can be prevented by attaching a ring-shaped radial or conical guide to the rear edge of the suction opening, whereby the guide extends radially at least in level with the tip of the blade.

The operation of the fan of the invention is similar to that of the fan of German Offenlegungsschrift 32 07 448, which fan is provided with radial blades and an oblique rear plate. As distinct from this prior art fan, however, the turbulent flows formed in the front and rear portions of the cover and the corresponding losses are smaller and the noise level is markedly lower in the fan of the invention.

The static pressure created by the fan of the invention is of the same order or higher than the pressure to be obtained by means of an axial fan provided with guide vanes of the same diameter. The structure of the invention is, however, much simpler and cheaper, similarly when compared with a corresponding radial fan provided with backwardly curving blades. Also, the noise level is very low and the efficiency markedly higher than with a corresponding fan provided with straight radial blades and operating in both directions. Since the operability of the fan of the invention is not strictly dependent on the relative size of the suction opening and the propeller, the efficiency and/or noise level of the ventilation can be greatly affected by using propellers of different sizes with one and the same cover. In this way, the same propellers can be used, e.g., with machines of the same type but of different speed or even with machines of the same series but of different shaft heights, that is, with different rates of rotation and different noise level requirements, which enables standardization.

Figure 3:
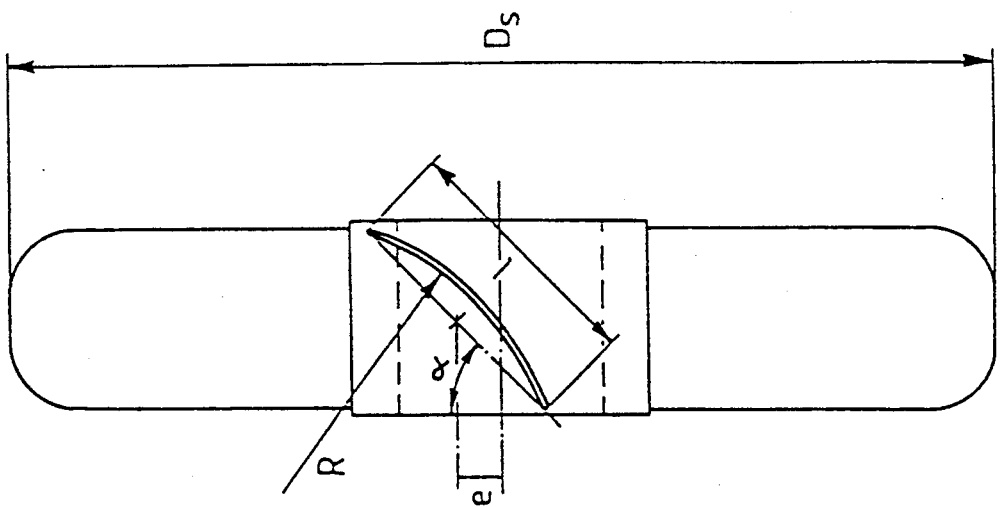
Figure 2:
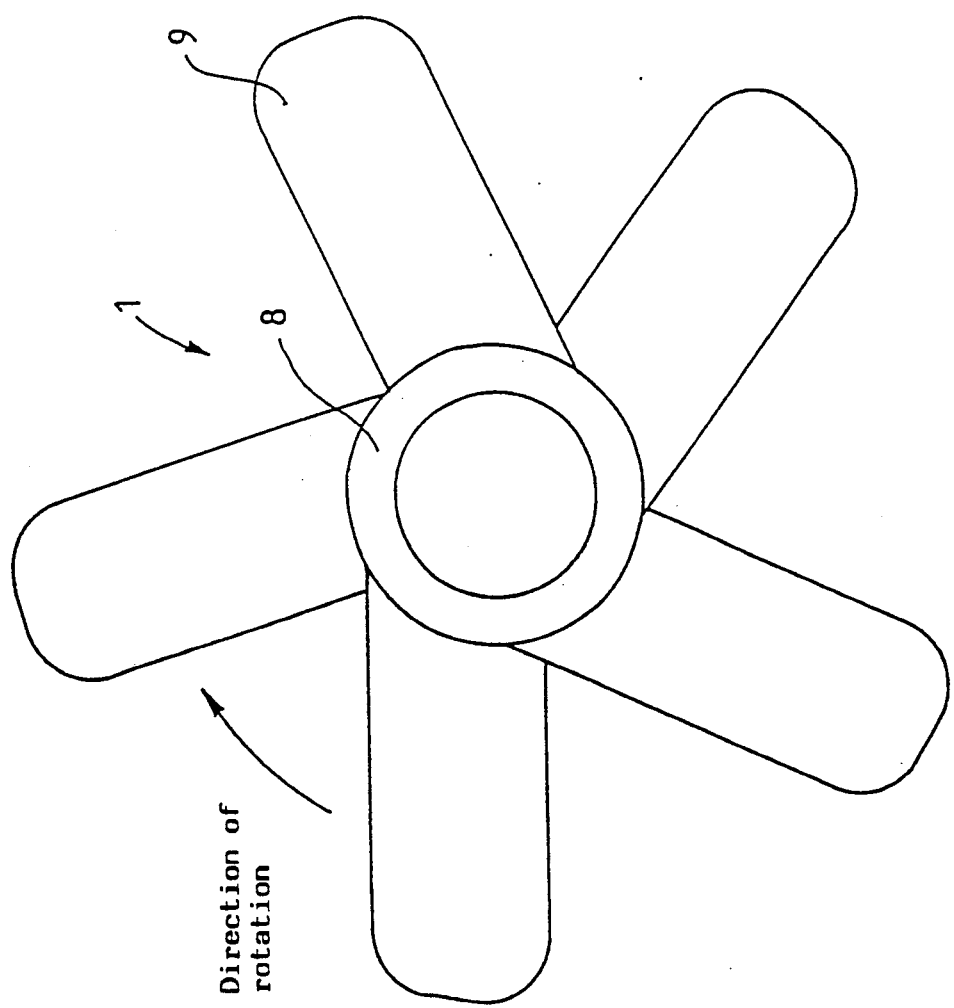

In the following the fan of the invention for an electrically operated machine will be described in greater detail with reference to the attached drawing, in which FIG. 1 is a sectional view of the invention when fitted in an electrically operated machine;

FIG. 2 shows the fan of the invention seen from the suction side of the fan propeller (from the front of the propeller); and FIG. 3 is a side view of the propeller of the invention.

FIG. 1 is a general structural view of the fan of the invention. The fan comprises a propeller 1 mounted on the shaft of an electrically operated machine, a fan cover 2, a suction opening 3 in the cover in front of the propeller, a net, perforated plate or the like 4 in front of the suction opening as a protective cover, and a possible cylindrical extension 5 of the suction opening and an air guide 6 possibly attached to it. An axial gap s is defined between the suction opening 3 or its extension 5, if any, and the propeller. The size of this gap varies from case to case, being max. 20% of the diameter $D_S$ of the propeller on the pressure side. Depending on the structure of the electrically operated machine, the machine frame is usually positioned behind the propeller. The cover 2 radially outside the propeller 1 and the suction opening 3 is at a relatively great distance from the propeller and does not form a hood normally required for the propeller of the axial fan. The inner diameter of the cover 2 should be at least 1.2 times the outer diameter $D_S$ of the propeller or the inner diameter $D_A$ of the suction opening, depending on which one of them is larger. On the pressure side the cover comprises an opening 7 from which ventilation air (indicated with flow arrows) is directed in a desired manner to cooling ribs 10 on the outside of the machine, to a heat exchanger or to other machine parts to be cooled. The shape of the fan cover 2 and the shape and position of the opening 7 depend on the other structural features of the machine and the position of the fan in the machine. In the example of FIG. 1, the diameter of the cover 2 is substantially equal to the outer diameter of the electrically operated machine.

The propeller 1 is formed by a plurality of primarily radial blades 9 attached to a hub 8 at a blade angle $\alpha$. At simplest, the blades are bent from sheet metal. They have a width 1 and a radius of curvature R and are attached to the hub 8 by welding.

In the exemplifying structural arrangement of FIGS. 2 and 3, the number of the blades 9 of the propeller 1 is 5 and they are attached to the hub with an uneven distribution. In addition, the blades are displaced over a distance e onwards in the direction of rotation, the distance e being determined as a distance between the centre of a chord corresponding to the curvature of the blade and a line going in parallel with the main direction of the blade and through the centre point of the hub. Alternatively, the blades could be positioned with an even distribution. In this case, however, the blade-frequency (=the number of blades×rotation frequency) sound component and its harmonic multiples may be disturbingly distinguishable from the sound caused by the fan. In place of sheet metal blades of uniform thickness it is, of course, also possible to use profiled blades preferably cast of plastic or metal integral with the hub.

To decrease flow losses, the suction opening 3 may be conical, rounded at the edge, etc. It may also be extended by a cylindrical part 5. The suction opening may also be in the form of an outwardly opening suction cone and the front portion of the cover may be conical. The inner diameter $D_A$ of the suction opening or its extension before the propeller is 0.8 to 1.6 times the outer diameter $D_S$ of the propeller. A gap s defined between the suction opening or its cylindrical extension and the propeller in the axial direction depends on the dimensions of the opening and the propeller, the rate of rotation of the fan etc, but is at the most 20% of the outer diameter of the propeller. The cylindrical extension of the suction opening may also be used to increase the distance from the propeller 1 to the net 4 acting as a protective cover.

The fan of the invention has been described above by means of one exemplifying embodiment, and it is to be understood that it can be modified in various ways without deviating from the scope defined in the attached claims. Accordingly, the number of the blades of the propeller may vary and they may be of uniform width as described above or the width may vary, e.g. decrease or increase towards the tips. In the structure of FIG. 1, the propeller is attached to the shaft of the electrically operated machine to be cooled, whereby it obtains operating power from this shaft. The propeller may, however, be fitted on the shaft of the machine in such a way that it is connected to the shaft of its own operating motor and not at all to the shaft of the machine to be cooled even though it is positioned axially with it. This arrangement is feasible mainly in cases where the rate of rotation of the machine to be cooled is so low that sufficient cooling cannot be obtained by mounting the propeller to it.

I claim:

1. A fan for an electrically operated machine, comprising a propeller (1) arranged axially about the machine and including a hub (8) and several blades attached to it and projecting substantially radially from it; and a cover (2) surrounding the propeller (1) in the front and on the sides and comprising a suction opening (3) on the suction side of the propeller (1) and an opening (7) on the pressure side for passing ventilation air into the machine parts to be cooled, c h a r a c t e r i z e d by the combination of the following features:

the blades (9) have a radius of curvature (R) and they are attached to the hub (8) at a blade angle ($\alpha$) between 25° and 70°;

a gap (S) defined between the suction opening (3) or a cylindrical extension (5) thereof and the blades (9) of the propeller (1) in the axial direction is no more than 20% of the outer diameter of the propeller (1);

the inner diameter ($D_A$) of the suction opening (3) before the propeller (1) is 0.8 to 1.6 times the outer diameter ($D_S$) of the propeller; and the inner diameter of the cover (2) is at least 1.2 times the outer diameter ($D_S$) of the propeller or the inner diameter ($D_A$) of the suction opening, depending on which one of them is larger.

2. A fan according to claim 1, c h a r a c t e r i z e d in that the blades (9) of the propeller (1) are displaced onwards in the direction of rotation over a distance (e) which is 0 to 0.8 times the blade width (1), the distance (e) being defined as the distance between the centre of a chord corresponding to the curvature of the blade and a line going in parallel with the main direction of the blade and through the centre point of the hub.

3. A fan according to claim 1, c h a r a c t e r i z e d in that when the outer diameter of the propeller (1) is greater than the inner diameter ($D_A$) of the suction opening (3) and the suction opening is provided with a cylindrical extension (5), the edge of said extension is provided with a ringshaped radial or conical guide (6) which extends radially at least in level with the tips of the blades (9) of the propeller (1).

* * * * *